(12) United States Patent
Coon et al.

(10) Patent No.: US 7,818,195 B2
(45) Date of Patent: Oct. 19, 2010

(54) METHOD, SYSTEM AND PROGRAM PRODUCT FOR REPORTING A CALL LEVEL VIEW OF A CUSTOMER INTERACTION WITH A CONTACT CENTER

(75) Inventors: Robert E. Coon, Port Orange, FL (US); James M. Donnelly, Alpharetta, GA (US); Michael S. Matthews, Roswell, GA (US); Vanessa V. Michelini, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 1088 days.

(21) Appl. No.: 11/483,165

(22) Filed: Jul. 6, 2006

(65) Prior Publication Data

US 2008/0021762 A1    Jan. 24, 2008

(51) Int. Cl.
*G06F 17/30* (2006.01)
(52) U.S. Cl. .............................................. 705/8
(58) Field of Classification Search ................. 705/7–9
See application file for complete search history.

(56) References Cited

U.S. PATENT DOCUMENTS

| | | | |
|---|---|---|---|
| 6,724,887 B1 * | 4/2004 | Eilbacher et al. | 379/265.03 |
| 6,760,727 B1 * | 7/2004 | Schroeder et al. | 707/10 |
| 7,103,562 B2 * | 9/2006 | Kosiba et al. | 705/10 |
| 7,391,865 B2 * | 6/2008 | Orsini et al. | 380/201 |
| 2002/0107727 A1 | 8/2002 | Traub | |
| 2003/0009373 A1 | 1/2003 | Ensing et al. | |
| 2003/0144900 A1 | 7/2003 | Whitmer | |
| 2005/0013428 A1 | 1/2005 | Walters, Jr. | |
| 2005/0232399 A1 | 10/2005 | Vos et al. | |

FOREIGN PATENT DOCUMENTS

WO   WO 01/74054 A1   10/2001

OTHER PUBLICATIONS

Kellen (CRM Measurement Frameworks) (http://www.crm2day.com/library/docs/ap0041.pdf), Feb. 2002, pp. 1-37.*

(Continued)

*Primary Examiner*—Romain Jeanty
(74) *Attorney, Agent, or Firm*—John R. Pivnichny; Law Office of Jim Boice

(57) ABSTRACT

A method and program product for reporting a call level view of a customer interaction with a contact center is provided. The method includes pulling data relating to a customer interaction from multiple source systems, parsing the data that is pulled and applying business rules thereto. The method further includes chronologically reassembling in a data warehouse the parsed data, summarizing the data that is reassembled and generating one or more reports from the summarized data. In an embodiment, the pulling step further includes collecting the data from the multiple source systems and storing the collected data in the data warehouse. In an embodiment, the parsing step includes parsing the data using a parsing engine. Further, the generating step includes analyzing the summarized data for ascertaining any relationships, patterns and associations in order to facilitate decisions that promote business development and optimize performance of the contact center.

17 Claims, 7 Drawing Sheets

OTHER PUBLICATIONS

Sisselman et al ( Preference-based Routing in Customer Contact Center), Jan. 2005, pp. 1-33.*

Paprzycki, et al., Data Mining Approach for Analyzing Call Center Performance, Innovations in Applied Artificial Intelligence: 17th International Conference on Industrial and Engineering Applications of Artificial Intelligence and Expert Systems, IEA/AIE 2004, Ottawa, Canada, May 17-20, 2004. Proceedings, vol. 3029/2004.

* cited by examiner

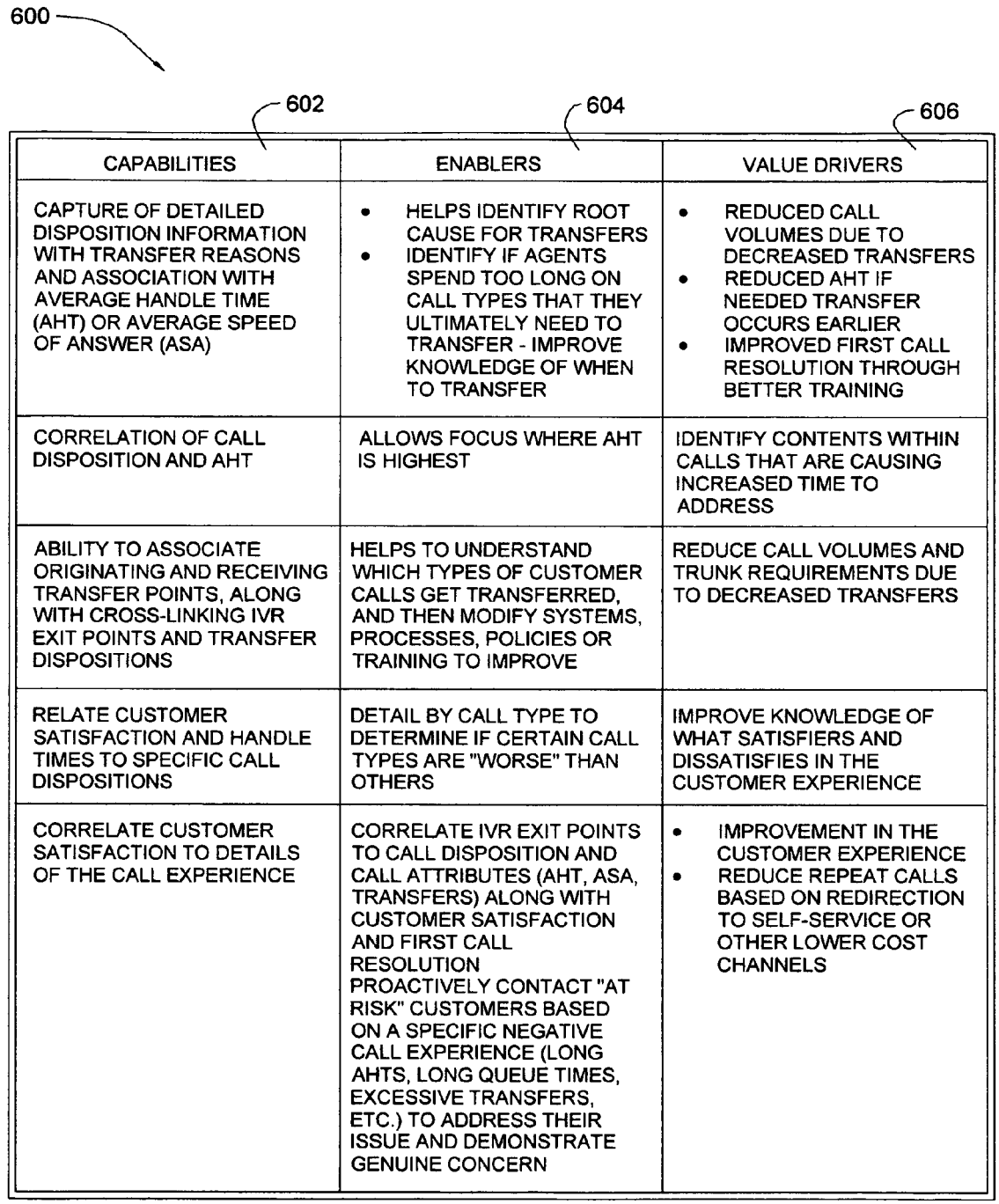

| CAPABILITIES | ENABLERS | VALUE DRIVERS |
|---|---|---|
| CAPTURE OF DETAILED DISPOSITION INFORMATION WITH TRANSFER REASONS AND ASSOCIATION WITH AVERAGE HANDLE TIME (AHT) OR AVERAGE SPEED OF ANSWER (ASA) | <ul><li>HELPS IDENTIFY ROOT CAUSE FOR TRANSFERS</li><li>IDENTIFY IF AGENTS SPEND TOO LONG ON CALL TYPES THAT THEY ULTIMATELY NEED TO TRANSFER - IMPROVE KNOWLEDGE OF WHEN TO TRANSFER</li></ul> | <ul><li>REDUCED CALL VOLUMES DUE TO DECREASED TRANSFERS</li><li>REDUCED AHT IF NEEDED TRANSFER OCCURS EARLIER</li><li>IMPROVED FIRST CALL RESOLUTION THROUGH BETTER TRAINING</li></ul> |
| CORRELATION OF CALL DISPOSITION AND AHT | ALLOWS FOCUS WHERE AHT IS HIGHEST | IDENTIFY CONTENTS WITHIN CALLS THAT ARE CAUSING INCREASED TIME TO ADDRESS |
| ABILITY TO ASSOCIATE ORIGINATING AND RECEIVING TRANSFER POINTS, ALONG WITH CROSS-LINKING IVR EXIT POINTS AND TRANSFER DISPOSITIONS | HELPS TO UNDERSTAND WHICH TYPES OF CUSTOMER CALLS GET TRANSFERRED, AND THEN MODIFY SYSTEMS, PROCESSES, POLICIES OR TRAINING TO IMPROVE | REDUCE CALL VOLUMES AND TRUNK REQUIREMENTS DUE TO DECREASED TRANSFERS |
| RELATE CUSTOMER SATISFACTION AND HANDLE TIMES TO SPECIFIC CALL DISPOSITIONS | DETAIL BY CALL TYPE TO DETERMINE IF CERTAIN CALL TYPES ARE "WORSE" THAN OTHERS | IMPROVE KNOWLEDGE OF WHAT SATISFIERS AND DISSATISFIES IN THE CUSTOMER EXPERIENCE |
| CORRELATE CUSTOMER SATISFACTION TO DETAILS OF THE CALL EXPERIENCE | CORRELATE IVR EXIT POINTS TO CALL DISPOSITION AND CALL ATTRIBUTES (AHT, ASA, TRANSFERS) ALONG WITH CUSTOMER SATISFACTION AND FIRST CALL RESOLUTION PROACTIVELY CONTACT "AT RISK" CUSTOMERS BASED ON A SPECIFIC NEGATIVE CALL EXPERIENCE (LONG AHTS, LONG QUEUE TIMES, EXCESSIVE TRANSFERS, ETC.) TO ADDRESS THEIR ISSUE AND DEMONSTRATE GENUINE CONCERN | <ul><li>IMPROVEMENT IN THE CUSTOMER EXPERIENCE</li><li>REDUCE REPEAT CALLS BASED ON REDIRECTION TO SELF-SERVICE OR OTHER LOWER COST CHANNELS</li></ul> |

FIG. 6

METHOD, SYSTEM AND PROGRAM PRODUCT FOR REPORTING A CALL LEVEL VIEW OF A CUSTOMER INTERACTION WITH A CONTACT CENTER

FIELD OF THE INVENTION

The present invention relates to the field of contact centers and, more particularly, the invention relates to a method, system and computer program product for reporting a call level view of a customer interaction with a contact center.

BACKGROUND OF THE INVENTION

In today's business environment, organizations and/or businesses utilize call centers to interact with their customers. Management of call centers involves balancing cost effectiveness and service. Often, organizations have to invest a lot of money to establish a call center infrastructure, while trying to maintain high levels of customer service. As such, there is a need for an efficient way to examine the level of service provided to the customers of these organizations and to improve customer satisfaction, while maintaining costs associated with operating a call center.

SUMMARY OF THE INVENTION

In one aspect of the invention, there is provided a method for reporting a call level view of a customer interaction with a contact center. The method comprises pulling data relating to a customer interaction from a plurality of source systems, parsing the data that is pulled and applying business rules thereto. The method further comprises chronologically reassembling in a data warehouse the data that is parsed, summarizing the data that is reassembled and generating one or more reports from the data that is summarized. In an embodiment, the pulling step further comprises collecting the data from the plurality of source systems and storing the data that is collected in the data warehouse. In an embodiment, the parsing step comprises parsing the data using a parsing engine. The generating step further comprises analyzing the data that is summarized for ascertaining any relationships, patterns and associations in order to facilitate decisions that promote business development and optimize performance of the contact center. In an embodiment, the plurality of source systems comprises at least one of: computing systems, telephony systems, interactive voice response (IVR) systems, workforce management applications, electronic mail systems, web collaboration systems, facsimile systems, wireless messaging systems, quality assurance applications and customer surveys. In an embodiment, the data comprises at least one of: IVR segment data, agent segment data, other channel interaction data, agent quality assurance score, customer satisfaction survey, back office electronic ticket information and status. In one embodiment, the IVR segment data comprises at least one of: business account number, personal telephone number, call identification, automatic number identification, automatic call distributor, dialed number string, transfer to agent, language code, call disposition code, exit code, application identification, menu identification, option identification backend request number, and backend result error number. In an embodiment, the agent segment data comprises at least one of: interaction identification, average handle time, interaction disposition, transfer information, after call work time, call center identification, and agent identification.

In another aspect of the invention, there is provided a system for reporting a call level view of a customer interaction with a contact center. The system comprises a data collection tool or component configured to collect data from a plurality of source systems relating to a customer interaction with a contact center and a parsing engine configured to parse the data collected and for applying business rules to the data collected, the parsing engine being configured to chronologically reassemble and summarize the data, the parsing engine being coupled to the data collection tool. The system further comprises a data warehouse component configured to store the summarized data, the data warehouse component being coupled to the data collection tool and the parsing engine. Further, the system comprises an analytics component configured to analyze the summarized data for any relationships, patterns and associations, the analytics component being coupled to the data warehouse and the parsing engine. The system further comprises a report generation component configured to create one or more reports from the summarized data that is analyzed. Further, the system comprises an information delivery component configured to disseminate or publish any reports generated in order to facilitate decisions that promote business development and optimize performance of the contact center. In an embodiment, the plurality of source systems comprises at least one of: computing systems, telephony systems, interactive voice response (IVR) systems, workforce management applications, electronic mail systems, web collaboration systems, facsimile systems, wireless messaging systems, quality assurance applications and customer surveys. In an embodiment, the data comprises at least one of: IVR segment data, agent segment data, other channel interaction data, agent quality assurance score, customer satisfaction survey, back office electronic ticket information and status. In an embodiment, the IVR segment data comprises at least one of: business account number, personal telephone number, call identification, automatic number identification, automatic call distributor, dialed number string, transfer to agent, language code, call disposition code, exit code, application identification, menu identification, option identification backend request number, and backend result error number. In an embodiment, the agent segment data comprises at least one of: interaction identification, average handle time, interaction disposition, transfer information, after call work time, call center identification, and agent identification.

In yet another aspect of the invention, there is provided a computer program product for reporting a call level view of a customer interaction with a contact center. The computer program product comprises a computer readable medium, first program instructions to collect data relating to a customer interaction from a plurality of source systems. The computer program product further comprises second program instructions to parse the data that is collected and to apply business rules thereto, the second program instructions including instructions to chronologically reassemble and summarize in a data warehouse the data that is parsed. Further, the computer program product comprises third program instructions to analyze the data that is summarized and to generate one or more reports from the analyzed data. In an embodiment, the first program instructions include instructions to store the data collected from the plurality of source systems in a data warehouse. Further, in an embodiment, the second program instructions include instructions to analyze the data summarized for facilitating decisions that promote business development and optimize performance of the contact center. In an embodiment, each of the first, second and third program instructions are stored on the computer readable medium. In an embodiment, the plurality of source systems comprises at least one of: computing systems, telephony systems, interactive voice response (IVR) systems, workforce management applications, electronic mail systems, web collaboration systems, facsimile systems, wireless messaging systems, quality assurance applications and customer surveys. In an embodiment, the data comprises at least one of: IVR segment data, agent segment data, other channel interaction data, agent quality assurance score, customer satisfaction survey, back office electronic ticket information and status. Further, in an embodiment, the IVR segment data comprises at least one of: business account number, personal telephone number, call identification, automatic number identification, automatic call distributor, dialed number string, transfer to agent, language code, call disposition code, exit code, application identification, menu identification, option identification backend request number, and backend result error number; and wherein the agent segment data comprises at least one of: interaction identification, average handle time, interaction disposition, transfer information, after call work time, call center identification, and agent identification.

In yet another aspect of the invention, there is provided a process for deploying computing infrastructure comprising integrating computer-readable code into a computing system, wherein the code in combination with the computing system is capable of performing a process for reporting a call level view of a customer interaction with a contact center. The process comprises collecting data from a plurality of source systems relating to a customer interaction with a call center, storing the data collected in a data warehouse, pulling the data that is stored for a call level view of the customer interaction and parsing the data that is pulled and applying business rules thereto. Further, the process comprises chronologically reassembling in the data warehouse the data that is parsed, summarizing the data that is reassembled and generating one or more reports from the data that is summarized. In an embodiment, the generating step further comprises analyzing the data that is summarized for facilitating decisions that promote business development and optimize performance of the contact center. In an embodiment, the plurality of source systems comprises at least one of: computing systems, telephony systems, interactive voice response (IVR) systems, workforce management applications, electronic mail systems, web collaboration systems, facsimile systems, wireless messaging systems, quality assurance applications and customer surveys. In an embodiment, the data comprises at least one of: IVR segment data, agent segment data, other channel interaction data, agent quality assurance score, customer satisfaction survey, back office electronic ticket information and status. Further, in an embodiment, the IVR segment data comprises at least one of: business account number, personal telephone number, call identification, automatic number identification, automatic call distributor, dialed number string, transfer to agent, language code, call disposition code, exit code, application identification, menu identification, option identification backend request number, and backend result error number; and wherein the agent segment data comprises at least one of: interaction identification, average handle time, interaction disposition, transfer information, after call work time, call center identification, and agent identification.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 6 is a table that illustrates the various capabilities, enablers and value drivers provided by a system that enables the reporting a call level view of a customer interaction with a contact center, in accordance with an embodiment of the present invention.

BEST MODE FOR CARRYING OUT THE INVENTION

Figure 1:
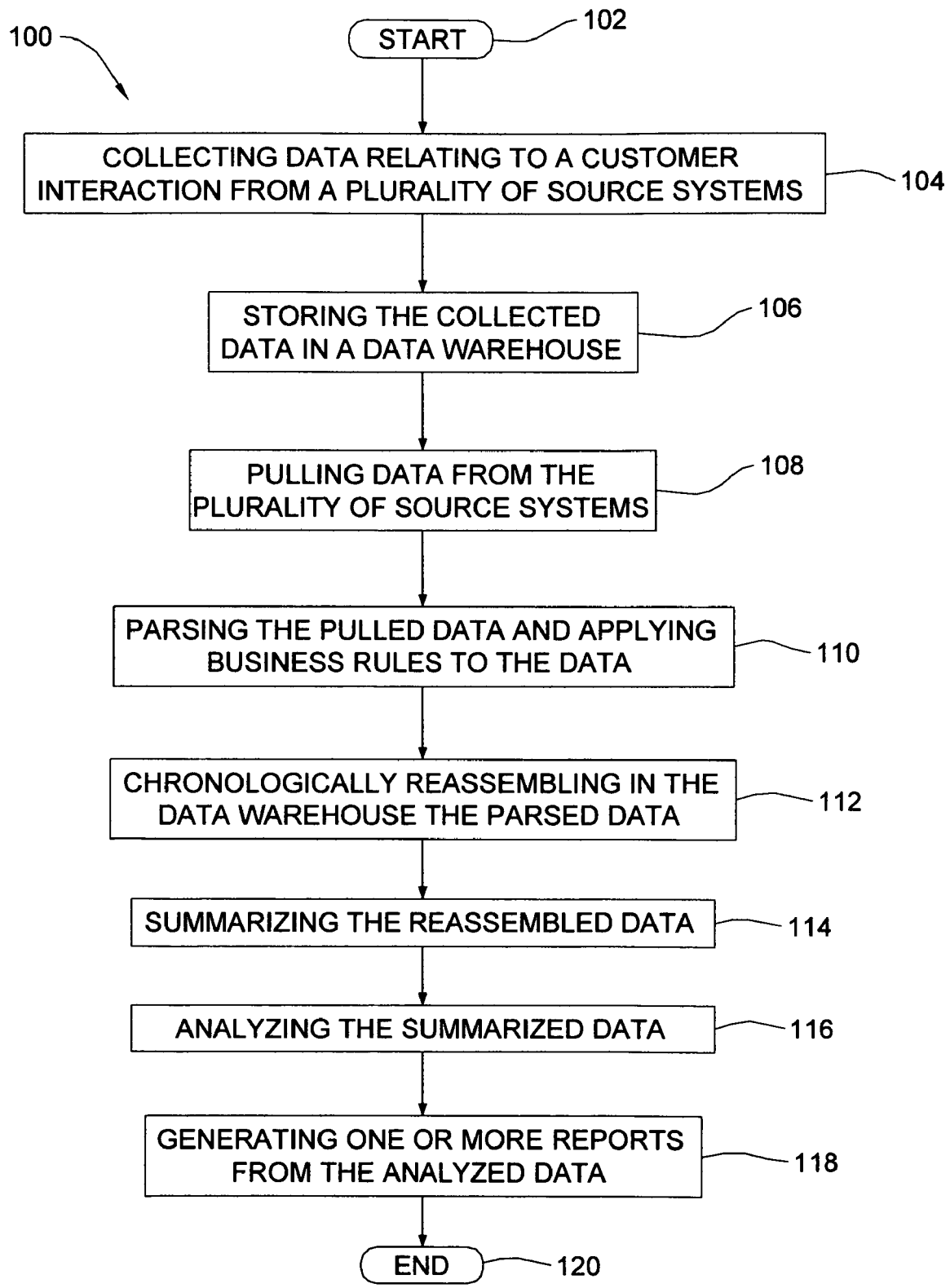
FIG. 1 is a flowchart depicting a method for reporting a call level view of a customer interaction with a contact center, in accordance with an embodiment of the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, the present invention provides a method for reporting a call level view of a customer interaction with a contact center. The method comprises pulling data relating to a customer interaction from a plurality of source systems, parsing the data that is pulled and applying business rules thereto. The method further comprises chronologically reassembling in a data warehouse the data that is parsed, summarizing the data that is reassembled and generating one or more reports from the data that is summarized. In an embodiment, the pulling step further comprises collecting the data from the plurality of source systems and storing the data that is collected in the data warehouse. In an embodiment, the parsing step comprises parsing the data using a parsing engine. The generating step further comprises analyzing the data that is summarized for ascertaining any relationships, patterns and associations in order to facilitate decisions that promote business development and optimize performance of the contact center. In an embodiment, the plurality of source systems comprises at least one of: computing systems, telephony systems, interactive voice response (IVR) systems, workforce management applications, electronic mail systems, web collaboration systems, facsimile systems, wireless messaging systems, quality assurance applications and customer surveys. In an embodiment, the data comprises at least one of: IVR segment data, agent segment data, other channel interaction data, agent quality assurance score, customer satisfaction survey, back office electronic ticket information and status. In one embodiment, the IVR segment data comprises at least one of: business account number, personal telephone number, call identification, automatic number identification, automatic call distributor, dialed number string, transfer to agent, language code, call disposition code, exit code, application identification, menu identification, option identification backend request number, and backend result error number. In an embodiment, the agent segment data comprises at least one of: interaction identification, average handle time, interaction disposition, transfer information, after call work time, call center identification, and agent identification.

Reference is now made to FIG. 1, which outlines a method for reporting a call level view of a customer interaction with a contact center, in accordance with an embodiment of the invention. Turning to FIG. 1, numeral 100 outlines, starting at step 102, a method of reporting a call level view with collecting in step 104 data from a plurality of source systems that relates to a customer interaction with a contact center. The method further includes storing the collected data in a data warehouse in step 106. The method further includes pulling the stored data in step 108 and parsing the pulled data in step 110 and applying business rules to the data that is pulled and parsed. Further, the method includes chronologically reassembling in step 112 the parsed data in the data warehouse. Furthermore, the method includes summarizing the reassembled data in step 114 and analyzing in step 116 the data that is summarized for ascertaining any relationships, patterns and associations in order to facilitate decisions that promote business development and optimize performance of the contact center. Further, the method includes generating in step 118 one or more reports from the analyzed data, ending the method at step 120. The method for reporting a call level view is further discussed in detail herein below with respect to FIGS. 2 through 4.

Figure 2:
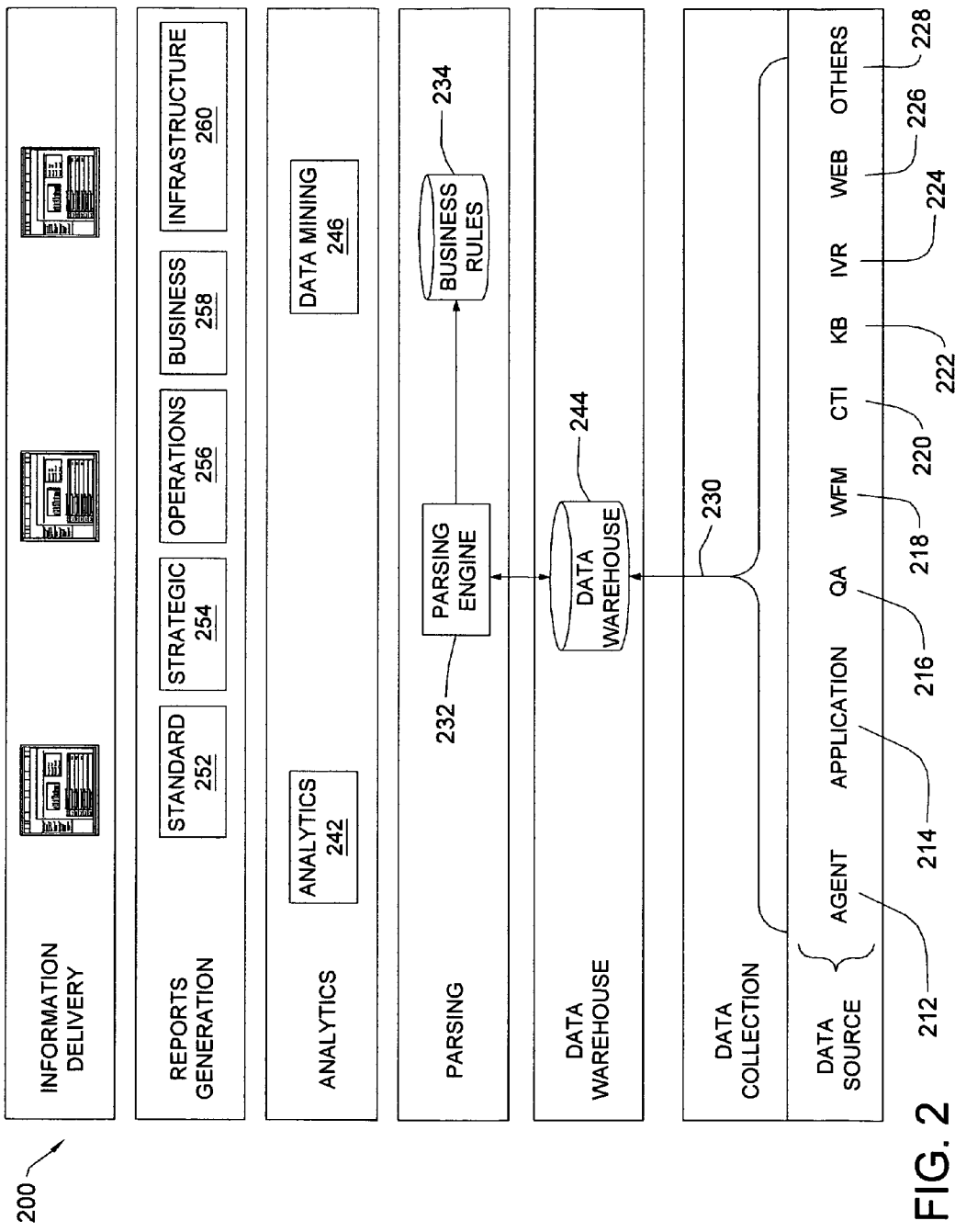
FIG. 2 is a schematic block diagram illustrating a method and infrastructure for reporting a call level view of a customer interaction with a contact center, in accordance with an embodiment of the present invention.
Figure 3:
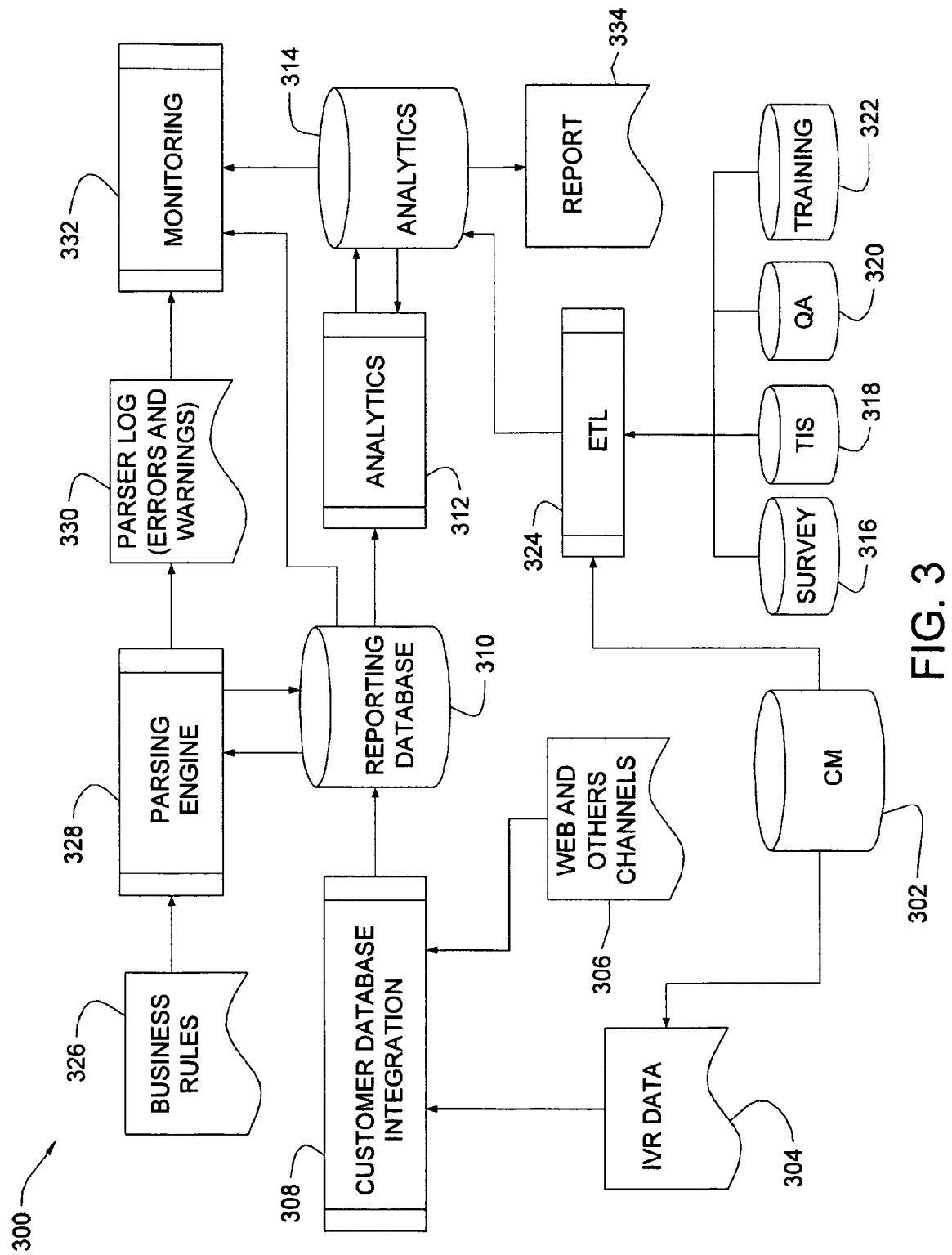
FIG. 3 is a schematic block diagram outlining a method for reporting a call level view of a customer interaction with a contact center, in accordance with an embodiment of the present invention.

Reference is now made to FIGS. 2 and 3, which depict and outline a method for reporting a call level view of a customer interaction with a contact center. Turning to FIG. 2, reference numeral 200 shows a schematic block system diagram of an infrastructure for reporting a call level view of a customer interaction with a contact center. As shown in FIG. 2, the infrastructure for reporting a call level view of a customer interaction with a contact center 200 includes a plurality of source systems (referred to as data source 210) from which data relating to a customer interaction with a contact center is collected. In particular, the plurality of source systems include agent desktops 212, application servers 214, quality assurance (QA) monitoring systems 216, work force management (WFM) systems 218, computer telephony integration (CTI) systems 220, knowledge base (KB) systems 222, interactive voice response (IVR) systems 224, web systems 226, for instance, web chat, web callbacks, web collaboration, etc.) and other systems 228, such as e-mail, fax, etc. The data relating to a customer interaction is collected (as shown by arrow 230) from these plurality of systems (212 through 228 in FIG. 2) and is stored in a data warehouse 244, which serves as a central repository facilitating data management and retrieval. The data stored in the data warehouse 244 is parsed using a parsing engine 232 and business rules 234 are applied to the parsed data. Also, the parsed data is chronologically reassembled in the data warehouse 244, such that a call level view of the entire customer interaction from start to finish can be understood. The chronologically reassembled data is summarized into tables in a useful manner so that the data can be analyzed, for instance, using data mining software 246 or an analytics tool or software 242. The data is analyzed from different perspectives in order to learn any relationships, associations and patterns in the summarized data for facilitating decisions that promote business development and optimize performance of the contact center. In particular, a variety of reports can be generated based on the analyzed data. For instance, a standard report 252 can be generated, which provides statistical information at the call level, for instance, how many calls were handled by a given agent. Further, a strategic report 254 can be generated, which provides insights for making strategic decisions. Additionally, an operations report 256 can provide insights for making decisions concerning operations, whereas, a business report 258 can provide insights for making business decisions. Furthermore, an infrastructure report 260 can provide insights on making decisions with respect to the infrastructure 200. The different reports that are generated may be published for information delivery purposes to various groups within the organization, such that, different perspectives may be provided to different levels of management for promoting business development and optimizing performance of the contact center. In an embodiment, the data can be collected and stored using an ETL (extract transform and load) product chosen from a variety of ETL products that are available in the marketplace and that are suited for the tasks/functions of extracting, transforming and loading the data. Similarly, the data warehouse 244, the analytics tool 242 and the data mining tool 246 can be a product that is available in the marketplace and that is suited for the respective task.

Turning to FIG. 3, reference numeral 300 shows a schematic block diagram that outlines a method for reporting a call level view of a customer interaction with a contact center, in accordance with an embodiment of the invention. When a customer interacts with a contact center by placing a call to a contact center, data relating to the customer interaction with the contact center is recorded by a call management (CM) system 302, preferably, any call management system that is commercially available in the marketplace that is suitable for the needs of a business. Each piece or segment of the IVR data 304 pertaining to the call, that is, data relating to the customer interaction within the IVR system itself gets recorded. In this regard, data pertaining to when the call gets transferred outside of the IVR, for instance, to an agent is recorded, but is not part of the IVR data 304. CM 302 tracks each piece or segment of the IVR data 304, that is, the CM 302 tracks all the IVR data 304, that is, any and every option chosen by a customer while in the IVR system. The IVR data 304 is passed, preferably, as an XML file onto to the customer database integration (CDI) system 308, which integrates the data and then forwards the integrated data to the reporting database (RD) 310, which stores the data. The data is stored in the reporting database 310. The reporting database 310 also records other channels of interaction data 306. The parsing engine 328 parses the data pulled from the reporting database 310 and applies any business rules 326 to the parsed data. In particular, the parsing engine 328 takes all the collected pieces of IVR data 326 from the reporting database 310 and chronologically reassembles the different data pieces pertaining to the customer call back together in a single call that can be analyzed by a business. Further, the parsing engine 328 applies any business rules 326, as necessary, to modify or adjust any data in the reporting database 310 and summarizes the data in a useful format, preferably, as summary tables that are stored in the reporting database 310. The summary tables containing the summarized data, preferably, satisfy requirements associated with reporting functions to be achieved for the business needs. If there are any errors or warnings, the parser engine 328 records the errors in a parser log 330. However, any critical errors are forwarded to the monitoring system 332, which handles the processing of any such critical errors that are noted in the parser log 330 as well as any errors noted in the reporting database 310. All of the data captured in the summary table of the reporting database 310 is picked up by a reporting and analytics tool 312, which has a user interface, so that the data can be put into a useable format that is stored in the analytics database 314. The analytics tool 312 also gathers data from any other source system or systems that played a role in the customer interaction with the call center. For instance, if a call was recorded for quality assurance 320 purposes, then that data is analyzed by the analytics tool 312 to see whether the agent did his or her job, etc. Similarly, if a customer satisfaction survey is conducted to get the customer's perspective or feedback, the survey data 316 is analyzed by the analytics tool 312. The TIS (ticket information system) data 318 includes any back-end process data where a customer's call is escalated to another level, such as to an agent, thus, a ticket is created for any action that needs to be handled by a back-end system and cannot be handled over the phone. Training data 322 includes data pertaining to any training calls made to new agents or to agents whose skill levels are being tested. The training data 322 is also analyzed by the analytics tool 312 to determine whether further training is needed, etc. The extract transform load tool (ETL) 324 pulls data from these other source systems in a batch mode process that is run preferably periodically and is stored in the analytics database 314. Further, the analytics tool 312 can run analytic queries against the data analyzed and stored in the analytics database 314 in the form of a structured report 334 or as any of the reports 252, 254, 256, 258 and/or 260 discussed herein above with respect to FIG. 2.

In another embodiment, the invention provides a system for reporting a call level view of a customer interaction with a contact center. The system comprises a data collection tool or component configured to collect data from a plurality of source systems relating to a customer interaction with a contact center and a parsing engine configured to parse the data collected and for applying business rules to the data collected, the parsing engine being configured to chronologically reassemble and summarize the data, the parsing engine being coupled to the data collection tool. The system further comprises a data warehouse component configured to store the summarized data, the data warehouse component being coupled to the data collection tool and the parsing engine. Further, the system comprises an analytics component configured to analyze the summarized data for any relationships, patterns and associations, the analytics component being coupled to the data warehouse and the parsing engine. The system further comprises a report generation component configured to create one or more reports from the summarized data that is analyzed. Further, the system comprises an information delivery component configured to disseminate or publish any reports generated in order to facilitate decisions that promote business development and optimize performance of the contact center. In an embodiment, the plurality of source systems comprises at least one of: computing systems, telephony systems, interactive voice response (IVR) systems, workforce management applications, electronic mail systems, web collaboration systems, facsimile systems, wireless messaging systems, quality assurance applications and customer surveys. In an embodiment, the data comprises at least one of: IVR segment data, agent segment data, other channel interaction data, agent quality assurance score, customer satisfaction survey, back office electronic ticket information and status. In an embodiment, the IVR segment data comprises at least one of: business account number, personal telephone number, call identification, automatic number identification, automatic call distributor, dialed number string, transfer to agent, language code, call disposition code, exit code, application identification, menu identification, option identification backend request number, and backend result error number. In an embodiment, the agent segment data comprises at least one of: interaction identification, average handle time, interaction disposition, transfer information, after call work time, call center identification, and agent identification.

Referring back to FIG. 2, reference numeral 200 shows a schematic block system diagram of an infrastructure for reporting a call level view of a customer interaction with a contact center. As shown in FIG. 2, the infrastructure for reporting a call level view of a customer interaction with a contact center 200 includes a plurality of source systems from which data relating to a customer interaction with a contact center is collected. The source systems include agent desktops 212, application servers 214, quality assurance (QA) monitoring systems 216, work force management (WFM) systems 218, computer telephony integration (CTI) systems 220, knowledge base (KB) systems 222, interactive voice response (IVR) systems 224, web systems 226, for instance, web chat, web callbacks, web collaboration, etc.) and other systems 228, such as e-mail, fax, etc. The data collection component collects the data (as shown by arrow 230) relating to a customer interaction from these plurality of systems (212 through 228 in FIG. 2) and the data warehouse component stores the data in a data warehouse 244, which serves as a central repository facilitating data management and retrieval. In an embodiment, the parsing component parses, using a parsing engine 232, the data stored in the data warehouse 244 and applies any business rules (stored in the business rules database 234) that may be necessary to the parsed data. Further, the parsing engine chronologically reassembles the parsed data in the data warehouse 244 and summarizes the data, such that a call level view of the entire customer interaction from start to finish can be understood. Further, the analytics component analyzes the chronologically reassembled and summarized data to ascertain any relationships, patterns and/or associations in order to facilitate decisions that promote business development and optimize performance of the contact center. For instance, the summarized data may be analyzed using a data mining software 246 or an analytics tool or software 242. Additionally, the reports generation component is configured to create from the analyzed data one or more different types of reports, as described herein above with respect to FIG. 2 and will not be repeated here for convenience. Furthermore, an information delivery component disseminates or publishes the one or more reports that may be generated to various groups within the organization, such that, different perspectives may be provided to different levels of management for facilitating decisions that promote business development and optimize performance of the contact center. Also, the different reports that are generated may be used as a source for other reporting tools that may be used by a business.

Figure 4A:
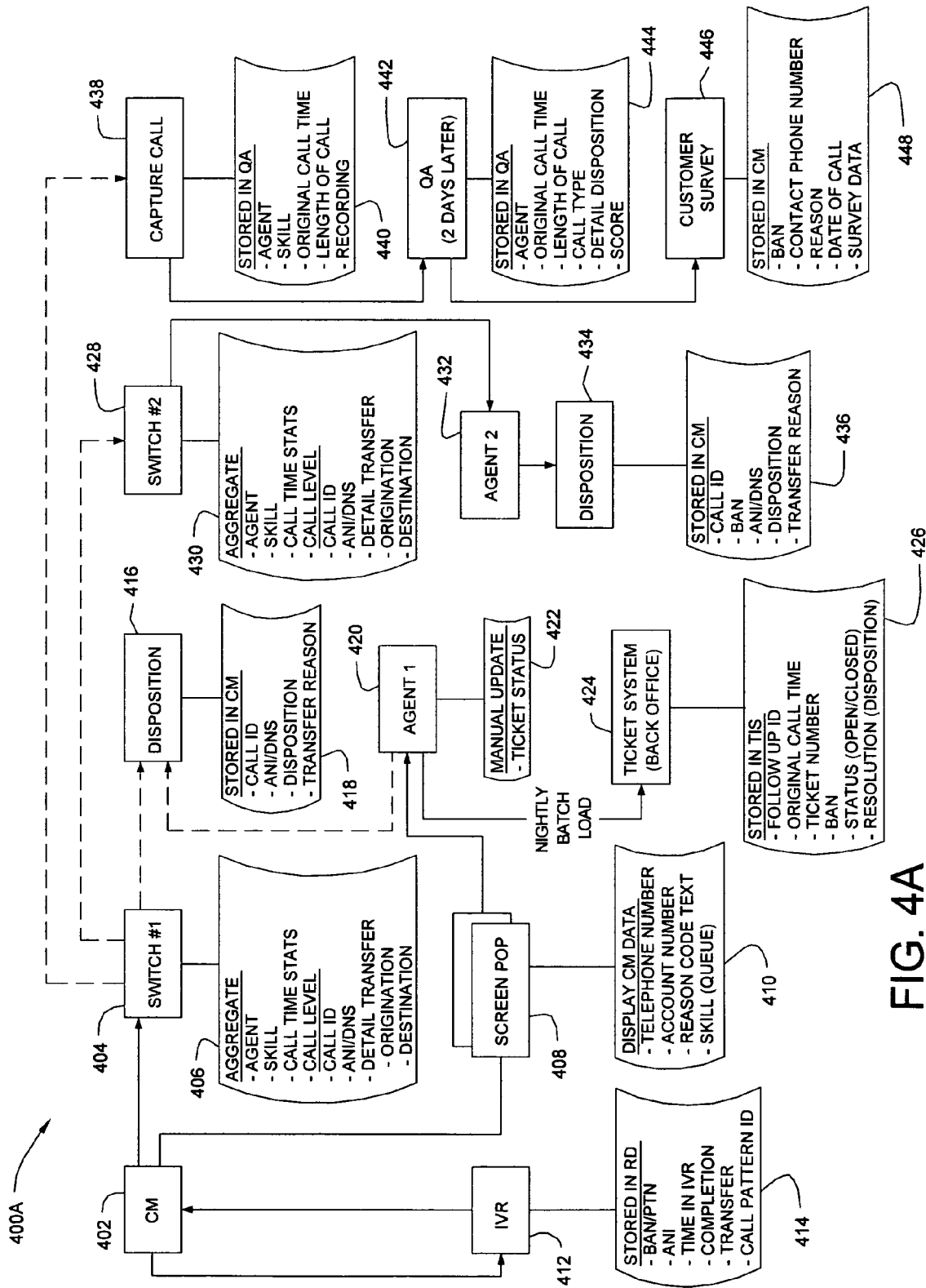
FIGS. 4A-4B together illustrate an example of a customer interaction with a contact center and the types of data that are collected by various source systems in order to report a call level view of the customer interaction with the contact center, in accordance with an embodiment of the present invention.
Figure 4B:
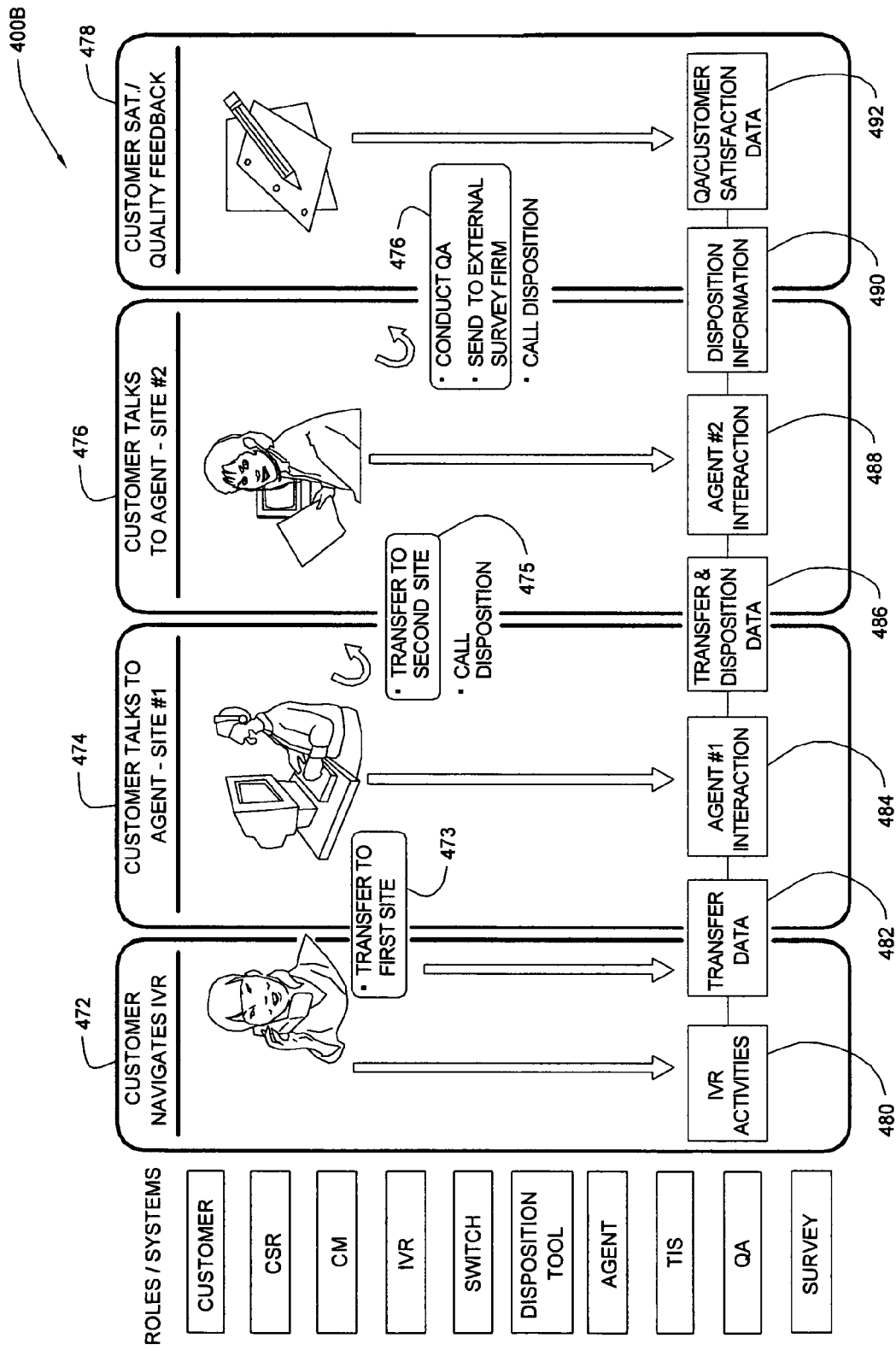

Reference is now made to FIGS. 4A and 4B, which together illustrate an example of a customer interaction with a contact center and the types of data that are collected by various source systems in order to report a call level view of the customer interaction with the contact center, in accordance with an embodiment of the present invention. In particular, FIGS. 4A and 4B show key data that is captured for a call by the IVR, so that the key data can be related to the rest of the call in order to chronologically reassemble the call from start to finish. Turning to reference numeral 400A of FIG. 4A, a customer call to a contact center is received into the CM (call management) system 402. The call gets routed to the IVR (interactive voice response) system 412 and data 414 relating to the call gets recorded in the reporting database (RD) through an interface with the call management (CM) system. The IVR system 412 handles customer interactions by responding to verbal commands or option selections by pushing a key on a device. The IVR system 412 captures all the information related to what the customer did while in the IVR system 412. The information recorded enables the determination of trends as to customer behavior in the IVR system 412 and can facilitate improvements in the IVR system 412 design based on customer behavior. In an embodiment, the IVR segment data 414 lists a few of the following, however, the IVR segment data may include any one or more of the following, as applicable: business account number (BAN), personal telephone number (PTN), call identification (ID), automatic number identification (ANI), automatic call distributor (ACD), dialed number string (DNS), time in IVR, completion (whether call was completed within the IVR), transfer (whether call was transferred to an agent from the IVR), call pattern ID identification (capturing a customer's path within the IVR using an IVR application ID corresponding to an option selected by the customer within the IVR). Further, as shown in FIG. 4A, if the customer wishes assistance from an agent or customer service representative (CSR), the call gets transferred by the CM system 402 from the IVR system 412, in this case, via switch #1, reference numeral 404, to an agent at site #1. The CM system 402 captures all information or data 406 pertaining to the customer interaction with the agent, referred to as the agent segment data, which is then stored in the reporting database. Some of the key agent segment data 406 that may be captured on an aggregate level include agent, skill and call time statistics (stats), whereas, data 406 that may be captured at the call level include call identification (ID), automatic number identification (ANI), dialed number string (DNS), and details of the transfer, such as origination (the number that was originally used to access the system) and destination (where the call is transferred to, if there is a transfer). Further, the CM system 402 provides a screen pop 408 that displays data 410 captured by the CM system 402 pertaining to the call on the agent 1 client 420, such as, telephone number, account number, reason code text (reason for the transfer to an agent), skill or queue, for instance, agent skills suitable for certain customer interactions or call types. The agent 1 client 418 also captures using a disposition tool 416 the disposition of the call (why the caller called) as well as other data 418, such as call identification (ID), automatic number identification (ANI), dialed number string (DNS), disposition of the call and transfer reason (reason why call was transferred from the IVR system). Further, agent #1 can manually update or look up the status of a ticket 422 that may have been created using a ticket system or ticket information system (TIS) 424 for any action that has to be handled by a back-end system, where a customer's call is escalated to another level, such as to another agent in a higher level skill group. The ticket information system (TIS) 424 may be updated with information from an agent client on a regular basis, for instance, by a nightly batch mode process. The TIS 424 can store information or data 426, such as, follow up ID, original call time, ticket number, business account number (BAN), status (whether ticket is still open or has been closed) and resolution (disposition of the ticket).

Furthermore, a customer call can be transferred from one agent to another agent. As shown in FIG. 4A, the customer call is transferred by the CM system 402 from switch #1, reference numeral 404, to switch #2, reference numeral 428, and to another agent (agent 2) at another location (site #2), as shown in FIG. 4B. Again, the CM system 402 captures all data or information pertaining to the customer interaction with the second agent, that is, the second agent segment data, which is then stored in the reporting database. For instance, the data 430 captured at an aggregate level includes agent, skill and call time statistics (stats) and where data at a call level includes call identification (ID), automatic number identification (ANI), dialed number string (DNS), and details of the transfer, such as origination and destination. The agent 2 client 432 also captures using a disposition tool 434 the disposition of the call (why the caller called) as well as other data 436, such as call identification (ID), automatic number identification (ANI), dialed number string (DNS), disposition of the call, and transfer reason (reason why call was transferred from the first agent). The data or information pertaining to the customer call that is captured by the first agent client is passed on to the second agent in order to keep the customer from being asked the same questions multiple times. Also, calls transferred from and by one agent to another agent are tracked by a quality assurance system 438. The quality assurance (QA) system 438 captures and stores data 440, such as, agent, skill, original call time, length of call and recording captured by the quality assurance system 438. Further, the data 440 captured by the quality assurance system 438 may be passed onto another quality assurance (QA) system 442, which stores data 444, such as, agent, original call time, length of call, call type, detail disposition and a QA score. Furthermore, the information from the second QA system 442 may be the basis for conducting a customer survey 446 in order to collect data 448 regarding a customer's experience, with the data 448 being stored, for instance, in the CM system 402. The data 448 includes BAN (business account number), contact phone number, reason (why customer called), date of call, and other customer satisfaction survey data.

Turning to FIG. 4B, reference numeral 400B summarizes the customer interaction shown in FIG. 4A and the data that gets captured by a system configured to report a call level view when certain events occur, such as transfer from an IVR to an agent, transfer from a first agent to a second agent, etc. In particular, the left hand side of FIG. 4B shows the different roles (customer, customer service representative (CSR)) and the different systems involved, such as, CM, IVR, etc. Column 472 represents the customer's interaction within the IVR system and provides information or data as to the different IVR activities or data 480 captured, as discussed hereinabove with respect to FIG. 4A. As the customer transfers out of the IVR to an agent at the first site (reference numeral 473), transfer data 482 is captured by the IVR system, as discussed hereinabove with respect to FIG. 4A. Column 474 represents the customer's interaction with the first agent at site #1. Again, data 484 pertaining to the customer's interaction with the first agent is captured by the system. Similarly, if the agent transfers the customer to a second agent (reference numeral 475), the transfer and disposition data 486 is captured by the system. Further, column 476 represents the customer's interaction with the second agent at site #2. Again, data 488 pertaining to the customer's interaction with the second agent is captured by the system. Also, any disposition data or information 490 is captured. If a quality assurance (QA) survey is conducted (reference numeral 476), then column 478, which represents any customer satisfaction or quality feedback information, would capture any QA/customer satisfaction data 492.

As one can appreciate, each of the different components, for instance, collection, data warehouse, analytics, etc. that is used for reporting a call level view of a customer interaction with a contact center can be any component or tool that is commercially available in the marketplace and one that is suited for the specific task/function, such as, collecting, storing/warehousing, analyzing, etc.

In yet another embodiment, the invention provides a computer program product for reporting a call level view of a customer interaction with a contact center. The computer program product comprises a computer readable or computer-usable medium, which provides program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. Preferably, the computer storage medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Further, preferably, network medium can comprise of transmission devices on a network, such as, cables, routers, switches and/or network adapter cards.

The computer program product further comprises first program instructions to collect data relating to a customer interaction from a plurality of source systems. The computer program product further comprises second program instructions to parse the data that is collected and to apply business rules thereto, the second program instructions including instructions to chronologically reassemble and summarize in a data warehouse the data that is parsed. Further, the computer program product comprises third program instructions to analyze the data that is summarized and to generate one or more reports from the analyzed data. In an embodiment, the first program instructions include instructions to store the data collected from the plurality of source systems in a data warehouse. Further, in an embodiment, the second program instructions include instructions to analyze the data summarized for facilitating decisions that promote business development and optimize performance of the contact center. In an embodiment, each of the first, second and third program instructions are stored on the computer readable medium. In an embodiment, the plurality of source systems comprises at least one of: computing systems, telephony systems, interactive voice response (IVR) systems, workforce management applications, electronic mail systems, web collaboration systems, facsimile systems, wireless messaging systems, quality assurance applications and customer surveys. In an embodiment, the data comprises at least one of: IVR segment data, agent segment data, other channel interaction data, agent quality assurance score, customer satisfaction survey, back office electronic ticket information and status. Further, in an embodiment, the IVR segment data comprises at least one of: business account number, personal telephone number, call identification, automatic number identification, automatic call distributor, dialed number string, transfer to agent, language code, call disposition code, exit code, application identification, menu identification, option identification backend request number, and backend result error number; and wherein the agent segment data comprises at least one of: interaction identification, average handle time, interaction disposition, transfer information, after call work time, call center identification, and agent identification.

Figure 5:
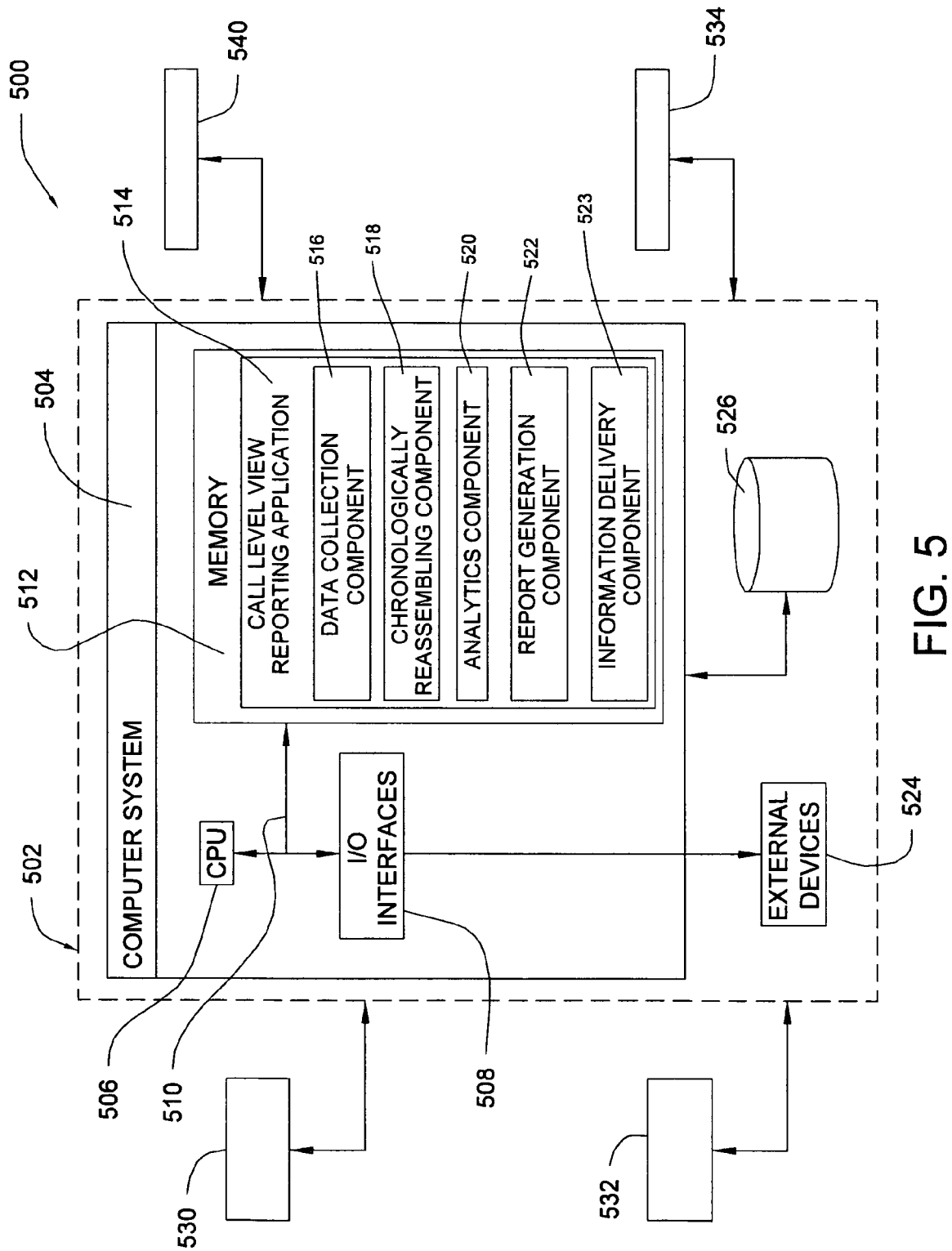
FIG. 5 is a schematic block system diagram illustrating a computer program product for reporting a call level view of a customer interaction with a contact center, in accordance with an embodiment of the present invention.

Referring now to FIG. 5, there is illustrated a computer system 500 for reporting a call level view of a customer's interaction with a call center, according to the present invention. As depicted, system 500 includes a computer infrastructure 502, which is intended to represent any type of computer architecture that is maintained in a secure environment (i.e., for which access control is enforced). As shown, infrastructure 502 includes a computer system 504 that typically represents a server or the like. It should be understood, however, that although not shown, other hardware and software components (e.g., additional computer systems, routers, firewalls, etc.) could be included in infrastructure 502.

In general, a business person 530 or administrator 532 can interface with infrastructure 502 for reporting a call level view of a customer's interaction with a call center. To this extent, infrastructure 502 provides a secure environment. In general, the parties 530 or 532 could access infrastructure 502 directly, or over a network via interfaces (e.g., web browsers) loaded on computerized devices (e.g., personal computers, laptops, handheld devices, etc. not shown in FIG. 5). In the case of the latter, the network can be any type of network such as the Internet, a local area network (LAN), a wide area network (WAN), a virtual private network (VPN), etc. In any event, communication with infrastructure 502 could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, the parties 530 or 532 could utilize an Internet service provider or an Intranet to establish connectivity to infrastructure 502. It should be understood that under the present invention, infrastructure 502 could be owned and/or operated by a party such as provider 534, or by an independent entity. Regardless, use of infrastructure 502 and the teachings described herein could be offered to the parties on a subscription or fee-basis. In either scenario, an administrator 532 could support and configure infrastructure 502.

Computer system 504 is shown to include a CPU (hereinafter "processing unit 506"), a memory 512, a bus 510, and input/output (I/O) interfaces 508. Further, computer system 500 is shown in communication with external I/O devices/resources 524 and storage system 526. In general, processing unit 506 executes computer program code, such as the call level view reporting application code 514, which is stored in memory 510 and/or storage system 526. In particular, processing unit 506 executes the computer program code for the data collection component 516, the chronologically reassembling component 518, the analytics component 520, the report generation component 522 and the information delivery component 523. While executing computer program code, the processing unit 506 can read and/or write data, to/from memory 512, storage system 526, and/or I/O interfaces 508. In an embodiment, the processing unit 506 can read and/or write data pertaining to a customer interaction with a contact center in the storage system 526, such as the reporting database discussed herein above. Bus 510 provides a communication link between each of the components in computer system 500. External devices 524 can comprise any devices (e.g., keyboard, pointing device, display, etc.) that enable a user to interact with computer system 500 and/or any devices (e.g., network card, modem, etc.) that enable computer system 500 to communicate with one or more other computing devices, for instance, computer device 540, which has stored thereon business rules. In an embodiment, the chronologically reassembling component 518 is a parser engine that applies business rules stored in system 540 to the data to chronologically reassemble the data.

Computer infrastructure 502 is only illustrative of various types of computer infrastructures for implementing the invention. For example, in one embodiment, computer infrastructure 502 comprises two or more computing devices (e.g., a server cluster) that communicate over a network to perform the various process steps of the invention. Moreover, computer system 500 is only representative of various possible computer systems that can include numerous combinations of hardware. To this extent, in other embodiments, computer system 500 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 506 may comprise a single processing unit, or be distributed across one or more processing units in one or more locations, e.g., on a client and server. Similarly, memory 512 and/or storage system 526 can comprise any combination of various types of data storage and/or transmission media that reside at one or more physical locations. Further, I/O interfaces 508 can comprise any system for exchanging information with one or more external devices 524. Still further, it is understood that one or more additional components (e.g., system software, math co-processing unit, etc.) not shown in FIG. 5 can be included in computer system 500. However, if computer system 500 comprises a handheld device or the like, it is understood that one or more external devices 524 (e.g., a display) and/or storage system(s) 526 could be contained within computer system 500, not externally as shown.

Storage system 526 can be any type of system (e.g., a database) capable of providing storage for information or data pertaining to a customer interaction with a contact center under the present invention. To this extent, storage system 526 could include one or more storage devices, such as a magnetic disk drive or an optical disk drive. In another embodiment, storage system 526 includes data distributed across, for example, a local area network (LAN), wide area network (WAN) or a storage area network (SAN) (not shown). Although not shown, additional components, such as cache memory, communication systems, system software, etc., may be incorporated into computer system 500.

In yet another embodiment, the invention provides a process for deploying computing infrastructure comprises integrating computer-readable code into a computing system, wherein the code in combination with the computing system is capable of performing a process of reporting a call level view of a customer interaction with a contact center. The process comprises collecting data from a plurality of source systems relating to a customer interaction with a call center, storing the data collected in a data warehouse, pulling the data that is stored for a call level view of the customer interaction and parsing the data that is pulled and applying business rules thereto. Further, the process comprises chronologically reassembling in the data warehouse the data that is parsed, summarizing the data that is reassembled and generating one or more reports from the data that is summarized. In an embodiment, the generating step further comprises analyzing the data that is summarized for facilitating decisions that promote business development and optimize performance of the contact center. In an embodiment, the plurality of source systems comprises at least one of: computing systems, telephony systems, interactive voice response (IVR) systems, workforce management applications, electronic mail systems, web collaboration systems, facsimile systems, wireless messaging systems, quality assurance applications and customer surveys. In an embodiment, the data comprises at least one of: IVR segment data, agent segment data, other channel interaction data, agent quality assurance score, customer satisfaction survey, back office electronic ticket information and status. Further, in an embodiment, the IVR segment data comprises at least one of: business account number, personal telephone number, call identification, automatic number identification, automatic call distributor, dialed, number string, transfer to agent, language code, call disposition code, exit code, application identification, menu identification, option identification backend request number, and backend result error number; and wherein the agent segment data comprises at least one of: interaction identification, average handle time, interaction disposition, transfer information, after call work time, call center identification, and agent identification.

Accordingly, any of the components of the present invention as shown in FIG. 5 can be deployed, managed, serviced by a service provider who offers a process for reporting a call level view of a customer interaction with a contact center. Preferably, the invention provides a business method that performs the process steps of the invention on a subscription, advertising and/or fee basis. In particular, a service provider, such as a solution integrator could offer to report a call level view of a customer interaction with a contact center. In this case, the service provider can, for instance, create, maintain, and support a computer infrastructure that performs the process steps of the invention for one or more customers. In return, the service provider can receive payment from the customer or customers under a subscription and/or fee agreement and/or the service provider can receive payment from the sale or advertising of content to one or more third parties.

Moreover, turning to FIG. 6, reference numeral 600 shows a table that lists the potential capabilities (column 602), enablers (column 604) and value drivers (column 606) that can be provided by the capture of the call level data associated with a customer's interaction with a contact center from the start of the call to the end of the call, as described herein above. For instance, the reporting system is capable of capturing detailed disposition information, such as, transfer reasons and average handle time (AHT) of an agent, which can enable one to identify root causes for transfers and can help identify if an agent is spending too long on a call that they ultimately transfer. The information presented in FIG. 7 is self-explanatory and as such will not be discussed in detail.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for reporting a call level view of a customer interaction with a contact center, said method comprising the steps of:
pulling data relating to customer interactions from a plurality of source systems for a contact center by:
collecting said data from said plurality of source systems, and
storing said data that is collected in a data warehouse;
using a parsing engine to parse said data that is pulled;
applying business rules to said data that is parsed, wherein the business rules are applied to control a chronological reassembling of the data from the plurality of source systems to generate a start-to-finish call level view of all of the customer interactions with the contact center;
a computer chronologically reassembling in a data warehouse said data that has been parsed by the business rules;
summarizing said data that is reassembled; and
generating one or more reports from said data that is summarized, wherein said generating said one or more reports is performed by analyzing said data that is summarized in order to ascertain any relationships, patterns and associations in order to facilitate decisions that promote business development and optimize performance of the contact center.

2. The method according to claim 1, wherein said plurality of source systems comprises at least two systems from a group consisting of a telephony system, an interactive voice response (IVR) system, an electronic mail system, a web collaboration system, a facsimile system, and a wireless messaging system.

3. The method according to claim 1, wherein said plurality of source systems comprises a computer telephony integration (CTI) system, an interactive voice response (IVR) system, an electronic mail system, a web collaboration system, and a facsimile system.

4. The method according to claim 1, further comprising:
a software extract transform load (ETL) tool identifying data from a training call made to a new agent in the contact center; and
a software analytics tool utilizing the data pertaining to the training call made to the new agent to determine that further training is needed for the new agent.

5. The method according to claim 1, wherein said plurality of source systems comprises three of more systems from a group consisting of a computer telephony integration (CTI) system, an interactive voice response (IVR) system, an electronic mail system, a web collaboration system, and a facsimile system.

6. A system for reporting a call level view of a customer interaction with a contact center, comprising:
a data collection tool configured to collect data from a plurality of source systems relating to a customer interaction with a contact center, wherein the plurality of source system comprises at least two systems from a group consisting of a computer telephony integration (CTI) system, an interactive voice response (IVR) system, an electronic mail system, a web collaboration system, and a facsimile system;
a parsing engine configured to parse said data collected and for applying business rules to said data collected, wherein said business rules are applied to control a chronological reassembling of the data from the plurality of source systems to generate a start-to-finish call level view of all of the customer interactions with the contact center, wherein said parsing engine is configured to chronologically reassemble and summarize said data, and wherein said parsing engine is coupled to said data collection tool;
a data warehouse component configured to store said summarized data, said data warehouse component being coupled to said data collection tool and said parsing engine;
an analytics component configured to analyze said summarized data for any relationships, patterns and associations, said analytics component being coupled to said data warehouse and said parsing engine;
a report generation component configured to create one or more reports from said summarized data that is analyzed; and
an information delivery component configured to disseminate any reports generated in order to facilitate decisions that promote business development and optimize performance of said contact center.

7. The system according to claim 6, wherein said plurality of source systems comprises at least three of: computing systems, telephony systems, interactive voice response (IVR) systems, workforce management applications, electronic mail systems, web collaboration systems, facsimile systems, wireless messaging systems, quality assurance applications and customer surveys.

8. The system according to claim 7, wherein said data comprises IVR segment data, agent segment data, other channel interaction data, agent quality assurance score, customer satisfaction survey, back office electronic ticket information and status.

9. The system according to claim 8, wherein said IVR segment data comprises business account number, personal telephone number, call identification, automatic number identification, automatic call distributor, dialed number string, transfer to agent, language code, call disposition code, exit code, application identification, menu identification, option identification backend request number, and backend result error number.

10. The system according to claim 9, wherein said agent segment data comprises at least one of: interaction identification, average handle time, interaction disposition, transfer information, after call work time, call center identification, and agent identification.

11. A computer program product for reporting a call level view of a customer interaction with a contact center, said computer program product comprising:
a computer readable medium;
first program instructions to collect data relating to a customer interaction from a plurality of source systems, wherein the plurality of source system comprises at least two systems from a group consisting of a computer telephony integration (CTI) system, an interactive voice response (IVR) system, an electronic mail system, a web collaboration system, and a facsimile system, wherein said first program instructions include instructions to store said data collected from said plurality of source systems in said data warehouse;
second program instructions to parse said data that is collected and to apply business rules thereto, wherein the business rules are applied to control a chronological reassembling of the data from the plurality of source systems to generate a start-to-finish call level view of all of the customer interactions with the contact center, wherein said second program instructions including instructions to summarize in a data warehouse said data that is parsed, and wherein said second program instructions include instructions to analyze said data summarized for facilitating decisions that promote business development and optimize performance of said contact center;

third program instructions to analyze said data that is summarized and to generate one or more reports from said data; and wherein said first, second and third program instructions are stored on said computer readable medium.

12. The computer program product according to claim 11, wherein said plurality of source systems comprises at least three of: computing systems, telephony systems, interactive voice response (IVR) systems, workforce management applications, electronic mail systems, web collaboration systems, facsimile systems, wireless messaging systems, quality assurance applications and customer surveys.

13. The computer program product according to claim 12, wherein said data comprises IVR segment data, agent segment data, other channel interaction data, agent quality assurance score, customer satisfaction survey, back office electronic ticket information and status.

14. The computer program product according to claim 13, wherein said IVR segment data comprises business account number, personal telephone number, call identification, automatic number identification, automatic call distributor, dialed number string, transfer to agent, language code, call disposition code, exit code, application identification, menu identification, option identification backend request number, and backend result error number; and wherein said agent segment data comprises at least one of: interaction identification, average handle time, interaction disposition, transfer information, after call work time, call center identification, and agent identification.

15. A process for deploying computing infrastructure comprising integrating computer-readable code into a computing system, wherein said code in combination with said computing system is capable of performing a process for reporting a call level view of a customer interaction with a contact center, said process comprising:

collecting data from a plurality of source systems relating to a customer interaction with a contact center, wherein said plurality of source systems comprises at least two systems from a group consisting of a computer telephony integration (CTI) system, an interactive voice response (IVR) system, an electronic mail system, a web collaboration system, and a facsimile system;

storing said data that is collected in a data warehouse;

pulling said data that is stored for a call level view of said customer interaction;

parsing said data that is pulled and applying business rules thereto, wherein the business rules are applied to control a chronological reassembling of the data from the plurality of source systems to generate a start-to-finish call level view of all of the customer interactions with the contact center;

chronologically reassembling in said data warehouse said data that is parsed;

summarizing said data that is chronologically reassembled; and generating one or more reports from said data that is summarized, wherein said generating one or more reports is performed by analyzing said data that is summarized in order to facilitate decisions that promote business development and optimize performance of said contact center.

16. The process according to claim 15, wherein said plurality of source systems comprises at least one of: computing systems, telephony systems, interactive voice response (IVR) systems, workforce management applications, electronic mail systems, web collaboration systems, facsimile systems, wireless messaging systems, quality assurance applications and customer surveys.

17. The process according to claim 16, wherein said data comprises at least one of: IVR segment data, agent segment data, other channel interaction data, agent quality assurance score, customer satisfaction survey, back office electronic ticket information and status.

* * * * *